July 25, 1933.    L. E. LA BRIE    1,919,519
BRAKE
Filed Oct. 24, 1930

INVENTOR.
LUDGER E. LA BRIE
BY M.W. McConkey
ATTORNEY

Patented July 25, 1933

1,919,519

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 24, 1930. Serial No. 490,885.

This invention relates to brakes and is illustrated as embodied in an internal expanding brake for an automobile. An object of the invention is to provide a simple and positive applying device for the friction means of the brake, preferably of a sort which is adapted for use in a brake of the shiftable-anchorage type. In the arrangement illustrated, the ends of the brake friction means are connected by pivoted links to a floating lever which extends between said ends and which is operatively pivoted at one end to the end of a crank arm carried by a brake-operating shaft. The shaft is preferably supported by and arranged to extend through the backing plate of the brake so that it forms the equivalent of the usual cam shaft.

The above and other objects and features of the invention, including various novel and desirable details of construction, will be apparent from the following description of the illustrative embodiment shown in the accompanying drawing, in which.

Figure 1:
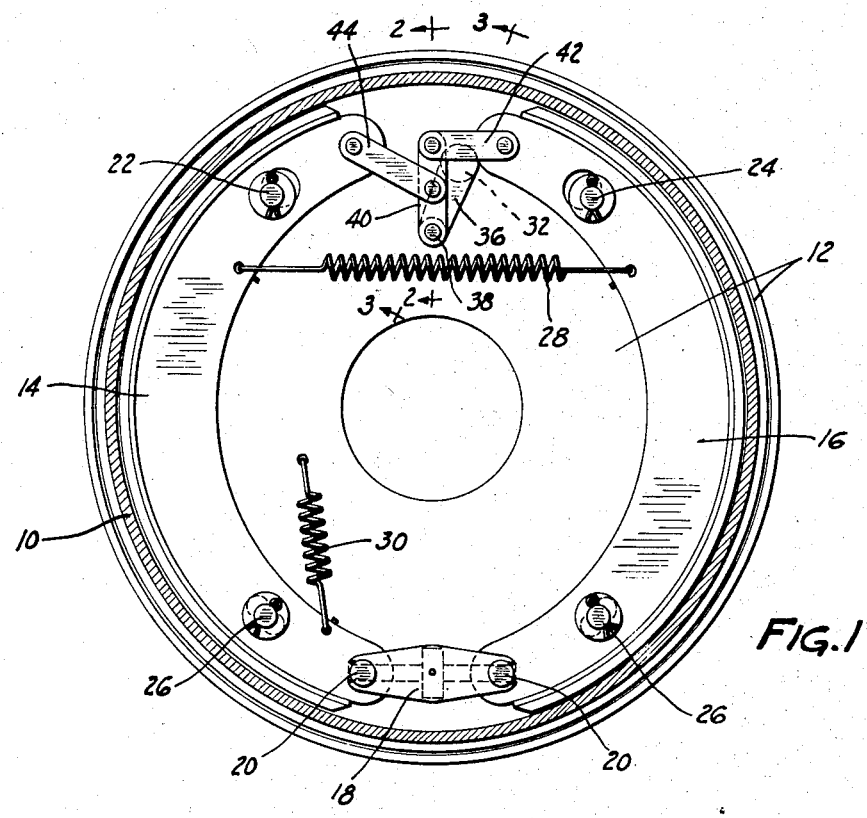
Figure 1 is a vertical section through the brake just inside the head of the brake drum and showing the brake shoes in side elevation.
Figure 2:
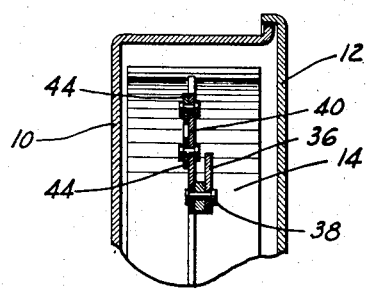
Figure 2 is a partial section on the line 2—2 of Figure 1 and showing the above-described floating lever.
Figure 3:
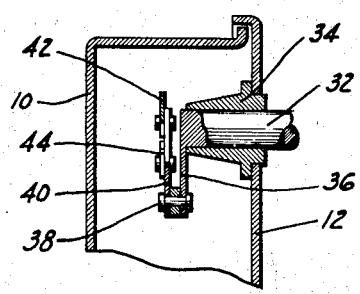
Figure 3 is a partial section on the line 3—3 of Figure 1 and showing the above-described shaft with its crank arm.

The illustrated brake, which is of the shiftable-anchorage type, includes a rotatable drum 10, at the open side of which is arranged a support such as a backing plate 12 and within which is arranged the friction means of the brake. The illustrated friction means includes a pair of shoes 14 and 16 connected by a suitable adjustable joint 18 mounted on pivots 20 carried by the lower ends of the shoes.

The brake has two anchorages 22 and 24 so arranged that if the drum is turning clockwise when the brake is applied, the shoe 14 anchors against the anchorage 22, while if the drum is turning counterclockwise when the brake is applied, the shoe 16 anchors against the anchorage 24. The friction means is provided with any suitable steady rests or the like 26. The brake is applied against the resistance of a main return spring 28 tensioned between the shoes and an auxiliary return spring 30 tensioned between the shoe 14 and the backing plate 12.

According to the present invention, the brake is applied by novel means, including a shaft 32 shown as being journaled in a bearing 34 carried by the backing plate 12 and which has at its brake end a crank arm 36 shown as being forged integrally of the shaft. The lower end of the crank arm 36 is connected by means such as a pivot 38 to a floating lever 40 which extends upwardly between the ends of the shoes 14 and 16. The upper end of the floating lever 40 is pivoted to one end of a thrust link 42, the opposite end of which is pivoted directly to the end of the shoe 16, while an intermediate part of the lever 40 is pivoted to a thrust link 44, the opposite end of which is pivoted directly to the end of the shoe 14.

It will be seen that rocking the shaft 32 to apply the brake tends to rock the floating lever 40 about its connection to the link 42 to thrust through the link 44 against the shoe 14, while the lever also tends to fulcrum about the connection to the link 44 to thrust through the link 42 against the shoe 16. The thrusts on the two shoes are balanced against each other and since there is approximately a 1 to 1 leverage in acting on the link 42 and approximately a 2 to 1 leverage in acting on the shoe 14. The thrusts, although balanced against each other as described, are therefore differentiated so that a greater pressure is applied to the shoe 14 than to the shoe 16, this being desired since the thrust on the shoe 14 is effective in applying the brake when the automobile is moving forward, while the thrust on the shoe 16 is effective when the automobile is moving backward and extremely powerful braking action is not necessary.

While one illustrative embodiment has been described in detail, it is not my intention to limit the scope of the invention to that particular embodiment or otherwise than by the terms of the appended claims.

I claim:

1. A brake comprising a backing plate having a floating friction device mounted thereon which is arranged to shift to anchor at one or the other of its ends, in combination with a shaft supported by the backing plate and having a crank arm adjacent the ends of the friction device, a floating lever pivoted to the end of the crank arm and extending between the ends of the friction device, and oppositely extending links, one of which connects the end of the floating lever to one end of the friction device and the other of which connects an intermediate portion of the floating lever to the other end of the friction device.

2. A brake comprising friction means having adjacent separable ends, in combination with applying means therefor, including a shaft journaled adjacent said ends and having mounted thereon a crank arm, a floating lever pivoted at one end to the end of the crank arm and extending between said ends of the friction means, and thrust links connecting different parts of the floating lever to said ends of the friction means respectively, the connections between the thrust links and said ends being at substantially the same distances radially from the center of the brake and the links being differently inclined accordingly.

LUDGER E. LA BRIE.